(12) United States Patent
Moon et al.

(10) Patent No.: US 11,344,843 B1
(45) Date of Patent: May 31, 2022

(54) AIR DRYER CARTRIDGE

(71) Applicant: SEMYUNGTECH CO., LTD., Seoul (KR)

(72) Inventors: Seong-won Moon, Asan-si (KR); Sang-sun Park, Iksan-si (KR)

(73) Assignee: SEMYUNGTECH CO., LTD., Seoul (KR)

( * ) Notice: Subject to any disclaimer, the term of this patent is extended or adjusted under 35 U.S.C. 154(b) by 0 days.

(21) Appl. No.: 17/555,548

(22) Filed: Dec. 20, 2021

Related U.S. Application Data (63) Continuation of application No. PCT/KR2020/018833, filed on Dec. 21, 2020.

(30) Foreign Application Priority Data

Dec. 18, 2020 (KR) ........................ 10-2020-0178404

(51) Int. Cl.
*B01D 53/02* (2006.01)
*B01D 53/26* (2006.01)
*B01D 45/08* (2006.01)
*B01D 53/04* (2006.01)

(52) U.S. Cl.
CPC ........... *B01D 53/261* (2013.01); *B01D 45/08* (2013.01); *B01D 53/0446* (2013.01); *B01D 2257/702* (2013.01); *B01D 2257/80* (2013.01); *B01D 2259/4566* (2013.01)

(58) Field of Classification Search
CPC .. B01D 53/261; B01D 53/0446; B01D 45/08; B01D 2257/702; B01D 2257/80; B01D 2259/4566
See application file for complete search history.

(56) References Cited

U.S. PATENT DOCUMENTS

| | | | | |
|---|---|---|---|---|
| 3,464,186 A | * | 9/1969 | Walker ................... | B01D 53/26 96/115 |
| 4,673,419 A | * | 6/1987 | Kojima ................ | B01D 53/261 96/144 |
| 4,816,047 A | * | 3/1989 | Neal .................... | B01D 53/261 55/475 |
| 5,595,588 A | * | 1/1997 | Blevins ................ | B60T 17/004 96/108 |
| 5,607,500 A | * | 3/1997 | Shamine .............. | B01D 53/261 96/138 |

(Continued)

FOREIGN PATENT DOCUMENTS

| | | |
|---|---|---|
| KR | 10-0855841 B1 | 9/2008 |
| KR | 10-2013-0000722 A | 1/2013 |

(Continued)

*Primary Examiner* — Christopher P Jones
(74) *Attorney, Agent, or Firm* — Revolution IP, PLLC (57) ABSTRACT

The present disclosure relates to a drier cartridge that can improve the effect of cleaning compressed air by filtering out water, oil, and foreign substances, which are contained in compressed air, through several steps therein. In particular, when a narrow compressed air channel is formed between a cartridge body and a cartridge housing, a collision member that is a pre-filtering member that can primarily filter out oil, etc. is formed between the cartridge body and the housing, whereby it is possible to improve the performance of removing oil and water from a filter cartridge.

17 Claims, 10 Drawing Sheets

(56) References Cited

U.S. PATENT DOCUMENTS

| | | | | |
|---|---|---|---|---|
| 5,622,544 | A * | 4/1997 | Shamine | B01D 53/261 |
| | | | | 96/138 |
| 6,558,457 | B1 * | 5/2003 | Kolczyk | B01D 53/261 |
| | | | | 55/318 |
| 7,097,696 | B2 * | 8/2006 | Salzman | B01D 53/261 |
| | | | | 96/139 |
| 7,789,950 | B2 * | 9/2010 | Hoffman | B01D 53/261 |
| | | | | 55/DIG. 17 |
| 7,909,920 | B2 * | 3/2011 | Amesoeder | B01D 53/261 |
| | | | | 96/139 |
| 8,663,375 | B2 * | 3/2014 | Minato | B01D 53/72 |
| | | | | 96/135 |
| 2006/0060609 | A1 | 3/2006 | Dobbs et al. | |
| 2007/0144350 | A1 | 6/2007 | Paling | |
| 2008/0289505 | A1 * | 11/2008 | Milomo | B60H 3/024 |
| | | | | 96/134 |
| 2009/0038476 | A1 * | 2/2009 | Blackwood | B60T 17/002 |
| | | | | 96/115 |
| 2012/0118157 | A1 * | 5/2012 | Eidenschink | B01D 53/261 |
| | | | | 96/118 |
| 2014/0260995 | A1 * | 9/2014 | Adams | B01D 53/261 |
| | | | | 96/400 |

FOREIGN PATENT DOCUMENTS

| | | |
|---|---|---|
| KR | 10-2013-0035106 A | 4/2013 |
| KR | 10-2014-0088349 A | 7/2014 |
| KR | 10-2014-0092349 A | 7/2014 |
| KR | 10-2018-0118715 A | 10/2018 |

* cited by examiner

AIR DRYER CARTRIDGE

CROSS-REFERENCE TO RELATED APPLICATION

This application is a Continuation Application of International Application No. PCT/KR2020/018833 filed on Dec. 21, 2020, which claims priority to Korean Application No. 10-2020-0178404 filed on Dec. 18, 2020, the entire contents of each of the above-identified applications are hereby incorporated by reference.

TECHNICAL FIELD

The present disclosure relates to an air drier cartridge that is applied to a compressed air processing system and, more particularly, to a filter cartridge of an air drier that is applied to a compressed air processing system for a commercial vehicle.

BACKGROUND ART

Commercial vehicles are equipped with various operation systems that use air pressure to control the operation of the large and heavy commercial vehicles. For example, a service brake system, a pneumatic suspension system, a parking brake system, etc. are such pneumatic systems. Compressed air at high pressure is required to drive such pneumatic systems. Such compressed air is produced through a compressor, which is driven by an engine or a driving motor, and then sent to the reservoirs of systems that use the compressed air.

The compressed air that is supplied through a compressor contains foreign substances including oil and water. Foreign substances such as oil and water in compressed air have a bad influence on systems such as causing breakdown or deteriorating durability of pneumatic systems.

Accordingly, systems that supply compressed air are equipped with a drier unit including a filter cartridge to produce dry air by filtering out foreign substances, such as oil, and absorbing water from the compressed air.

Figure 1:
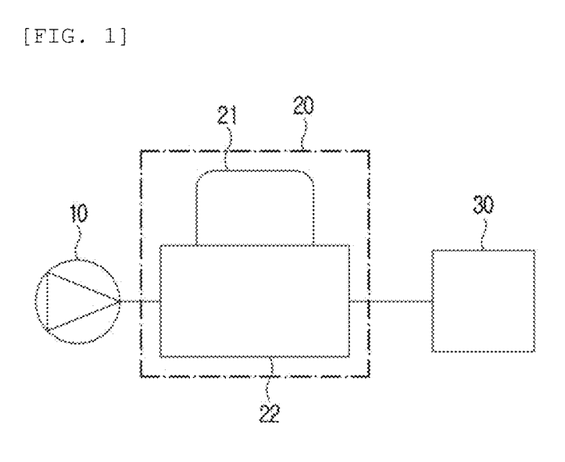
FIG. 1 shows an example of a compressed air processing system equipped with a drier unit in the related art.

FIG. 1 shows an example of a compressed air processing system equipped with a drier unit in the related art.

As shown in FIG. 1, while high-pressure compressed air produced by a compressor 10 passes through a drier unit 20, oil and water are removed. In particular, the compressed air flowing in the drier unit 20 is processed through a filter cartridge 21, and the processed compressed air is supplied to each consumption circuit through a valve assembly 22.

Meanwhile, when sufficient dehumidifying performance is not achieved, such as when the drier unit fully filled with a drying agent, a regeneration process for recovering the drying agent performance by returning dry compressed air to the drier unit may be performed, in which the compressed air substantially flows in the opposite direction to that when it is supplied.

In compressed air processing systems, not only contaminant particles contained in suctioned air, but oil and carbon black particles introduced in compressed air from a compressor during a compression process are removed from the compressed air. In addition, water existing in the compressed air is also removed. To this end, an air drier cartridge that can dehumidify compressed air, and preferably, can absorb even oil and contaminant particles is provided for compressed air processing systems for a commercial vehicle.

In relation to this, examples of a filter cartridge of the related art are disclosed in Korean Patent No. 10-2018-0118715 and Korean Patent No. 10-2079405.

Air drier units of the related art are generally configured such that dehumidifying performance is secured by filling the drier unit with a drying agent and an oil adsorption filter is installed around the inlet of compressed air to be able to remove oil. However, the structures of the cartridges for driers of the related art have limitation in sufficiently adsorbing and removing oil using only the oil adsorption filter. Further, a check valve is installed adjacent to the adsorption filter such that compressed air goes around the oil adsorption filter in regeneration. However, there is a problem that since the check valve is additionally installed, the manufacturing cost is increased and complete sealing cannot be achieved around the check valve.

Accordingly, it is required to further improve the performance of removing oil and water of a filter cartridge in order to improve the fuel efficiency of commercial vehicles and durability of systems. Further, there is a need for an air drier cartridge that enables a filter cartridge can be easily installed and replaced when it is periodically replaced and that can reduce the replacement cost by designing a filter cartridge that can be manufactured at a lower cost.

DISCLOSURE

Technical Problem

The present disclosure has been made in an effort to solve the problems described above and an objective of the present disclosure is to provide a drier cartridge that can improve the effect of cleaning compressed air by filtering out water, oil, and foreign substances, which are contained in compressed air, through several filtering stage therein.

Technical Solution

In order to achieve the objectives, a preferred embodiment of the present disclosure provides an air drier cartridge for a compressed air processing system for a commercial vehicle, the air drier cartridge including: a cartridge container having a drying agent in an internal space thereof; a housing for accommodating the cartridge container; a spring member installed in the housing to press the cartridge container; and a base configured to close an open side of the housing and having an intake port and a discharge port so that air can move into the housing, in which a gap for movement of compressed air is formed between an outer surface of the cartridge container and an inner wall of the housing, and a collision member is formed in the gap to filter out oil when air flowing in the gap hits against the collision member.

In particular, when a narrow compressed air channel is formed between a cartridge body and a cartridge housing, a collision member that is a pre-filtering member that can primarily filter out oil, etc. is formed between the cartridge body and the housing, whereby it is possible to improve the performance of removing oil and water from a filter cartridge.

Further, in the present disclosure, since compressed air with oil, etc. primarily filtered out by the collision member passes through the oil adsorption filter, there is an effect that it is possible to improve the lifespan of the oil adsorption filter by reducing the degree of contamination of the oil adsorption filter.

Advantageous Effects

According to the present disclosure, since a collision member that can primarily filter out oil, etc. from compressed air before the compressed air flows into the oil adsorption filter is disposed in the narrow channel between the cartridge body and the housing, there is an effect that it is possible to improve the performance of removing oil and water from a filter cartridge.

In particular, according to the present disclosure, there is an advantage that it is possible to improve the effect of cleaning compressed air by filtering out water, oil, and foreign substances, which are contained in compressed air, through several steps therein, using the collision member and the oil adsorption filter.

Further, in the present disclosure, since oil, etc. of compressed air are primarily filtered out by the collision member and then the compressed air passes through the oil adsorption filter, there is an effect that it is possible to improve the lifespan of the oil adsorption filter by reducing the degree of contamination of the oil adsorption filter.

Further, according to the present disclosure, since the oil adsorption filter is formed at the upper portion of the cartridge, there is an advantage that there is no need for a specific check valve.

Further, according to a preferred embodiment of the preset disclosure, since a 'E' shape gasket is installed at the valve housing, there is an effect that the sealing ability according to internal pressure is improved.

BEST MODE

A preferred embodiment of the present disclosure provides an air drier cartridge for a compressed air processing system for a commercial vehicle, the air drier cartridge including: a cartridge container having a drying agent in an internal space thereof; a housing for accommodating the cartridge container; a spring member installed in the housing to press the cartridge container; and a base configured to close an open side of the housing and having an intake port and a discharge port so that air can move into the housing, in which a gap for movement of compressed air is formed between an outer surface of the cartridge container and an inner wall of the housing, and a collision member is formed in the gap to filter out oil when air moving in the gap hits against the collision member.

Further, the cartridge container includes a cartridge body comprised of a cylindrical body part forming the gap between the housing and the cylindrical body part, and a frustoconical body part formed at the upper portion of the cylindrical body part, several ribs radially extending from the center of the cartridge container are formed at the frustoconical body part, and an annular oil adsorption filter is installed at the ribs.

In this case, several openings are formed along a conical surface at the upper end of the frustoconical body part so that air that has passed through the oil adsorption filter can flow into the cartridge container.

Further, the collision member protrudes from the outer surface of the cartridge container or the inner wall of the housing, and is comprised of at least one blade type protrusion continuously extending to be able to guide air to the upper portion of the gap from the downstream side of the gap.

The collision member may be a spiral blade type protrusion or a blade type protrusion in which a horizontal section parallel with a horizontal plane perpendicular to a central axis of the cartridge container and an inclined section inclined at a predetermined angle with respect to the horizontal plane are alternately disposed; and several flow holes may be formed in the direction of the central axis at the horizontal section of the blade type protrusion.

Further, the collision member may have: several horizontal blade protrusions spaced apart from each other and extending in parallel with the horizontal plane perpendicular to the central axis of the cartridge container; and several flow holes formed at the horizontal blade protrusions so that air can move between the upstream side and the downstream side of the gap.

According to another embodiment of the present disclosure, the collision member is comprised of several protrusions protruding from the outer surface of the cartridge container or the inner wall of the housing and spaced apart from each other to be able to interfere with flow of air between the upstream side and the downstream side of the gap. In this case, the protrusions may be V-shaped protrusions or circular protrusions.

Further, according to a preferred embodiment of the present disclosure, the protrusions may be formed on the outer surface of the cartridge container, and may be formed to face down such that an angle θ made between the bottom of the protrusion and the outer surface of the cartridge container is in the range of $0°<θ≤90°$.

MODE FOR INVENTION

Embodiments to be described hereafter are provided only for detailed description for those skilled in the art to be able to easily achieve the present disclosure without limiting the protective range of the present disclosure. Accordingly, some components may be substituted or changed without departing from the necessary range of the present disclosure.

When a component is 'connected' with another component in the following description, it includes not only direct connection of them, but connection of them with another element or device therebetween. Further, unless explicitly described otherwise, 'comprising' any components will be understood to imply the inclusion of other components rather than the exclusion of any other components.

An air drier cartridge described herein, similar to drier cartridges of the related art, is configured to remove oil in compressed air and dry and supply compressed air in one direction, and is configured to be able to perform a process of sending the compressed air in the opposite direction for regeneration of the cartridge and then discharging the compressed air to the atmosphere.

To this end, the air drier cartridge according to the present disclosure is also configured to include an intake port through which compressed air flows inside and a discharge port through which compressed air is discharged. The terms 'inflow' and 'discharge' are concepts that are relatively determined in accordance with the operation state of a compressed air processing system, and are related to the flow direction of compressed air. However, for the convenience of description herein, 'inflow' and 'discharge' are described on the basis of the state in which compressed air is supplied, that is, the state in which air produced by a compressor flows in the air drier cartridge and is then discharged to a valve assembly. For reference, since airflow is generated in the opposite direction in the cartridge in regeneration, it would be sufficiently understood by those skilled in the art that 'inflow' and 'discharge' are opposite to when compressed air is supplied.

Further, the expression that compressed air is 'processed' herein means that oil, water, and foreign substances in compressed air are filtered out while the compressed air passes through the filter cartridge.

An air drier cartridge according to preferred embodiments of the present disclosure is described hereafter with reference to the accompanying drawings.

Figure 2:
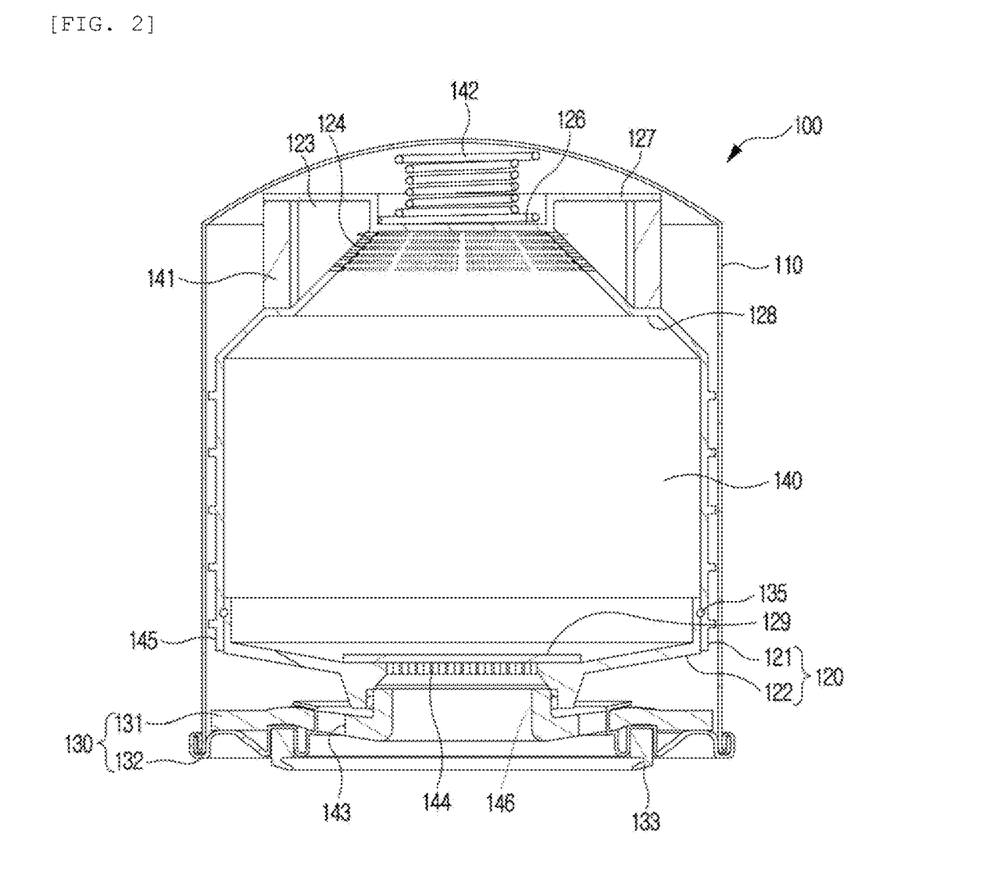
FIG. 2 shows a cross-section of a drier cartridge according to a preferred embodiment of the present disclosure.
Figure 3:
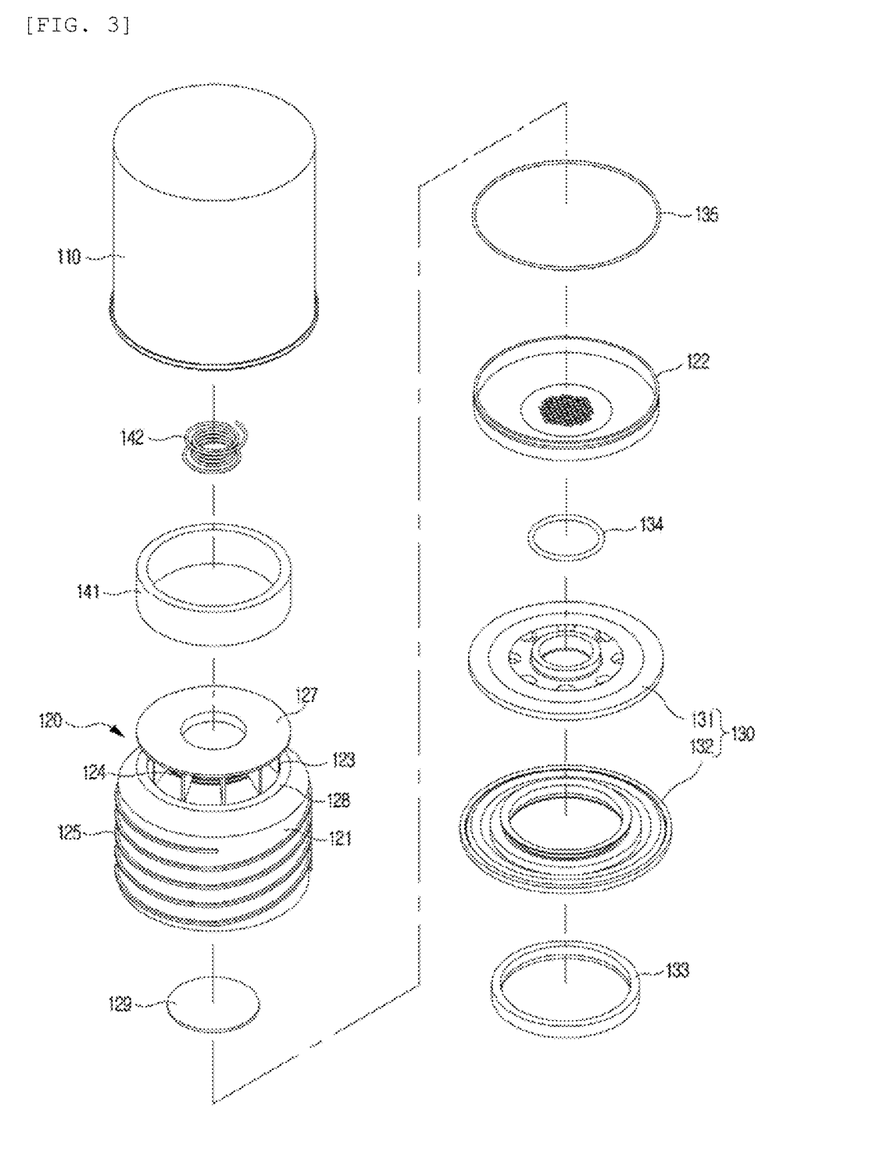
FIG. 3 is an exploded view of the drier cartridge according to a preferred embodiment of the present disclosure.

FIG. 2 shows a cross-section of a drier cartridge according to a preferred embodiment of the present disclosure and FIG. 3 shows disassembled components of the drier cartridge of FIG. 2.

An air drier cartridge 100 according to a preferred embodiment of the present disclosure is formed in a substantially rotation-symmetric shape with respect to a vertical central axis, in which a cartridge container 120 filled with a drying agent is accommodated in a substantially cylindrical housing 110. As shown in FIG. 2, the cylindrical housing 110 has a structure with an open end, and the opposite end is closed. For example, the housing 110 may be a cup shape formed by deep drawing on a thin metal plate.

The cartridge container 120 filled with a drying agent is positioned in the housing 110. The drying agent that is filled in the cartridge container 120 may be a powder-type desiccant having a dehumidifying function such as zeolite, or may be a structure impregnated with a drying agent. The drying agent fully fills the internal space of the cartridge container 120, and the density of the drying agent can be sufficiently increased when the cartridge container 120 is pressed by a spring member 142 at the upper end.

In a preferred embodiment of the present disclosure, the spring member 142 is positioned at the upper end of the housing 110, and accordingly, the spring member 142 presses downward the cartridge container 120 in a downward structure. A seat groove for seating the spring member 142 is formed on the top of the cartridge container 120 and a head plate 127 extending along a horizontal plane perpendicular to the central axis is formed around the seat groove. The head plate 127 functions as a vertical support for an oil adsorption filter 141 to be described below, and is configured to be able to be selectively supported at the closed end of the housing 110.

The cartridge container 120 means the entire container that accommodates a drying agent. The cartridge container 120 includes a substantially cylindrical cartridge body 121 and a cartridge cover 122 covering the opening of the cartridge body 121. The cartridge cover 122 functions as a lid that prevents the drying agent from be discharged outside, and has an outlet at the center that function as an outlet port 144 so that compressed air that has passed through the drying agent in the cartridge container 120 can be discharged. However, a porous member 129 such as a nonwoven fabric may be installed at the outlet to prevent the drying agent from being discharged through the outlet.

A base 130 coupled to the housing 110 to fix the cartridge container 120 inside is installed at the lower end of the cartridge container 120. Accordingly, the base 130 is positioned at the open side of the housing 110 and functions as a cover of the open side of the housing 110. The base 130 partially closes the open side of the housing 110. The fact that the open side of the housing 110 is partially closed means that movement of flow is restricted at the other region of the base 130 except for an intake port 143 and an outlet port 144 for sending air into/out of the housing 110. Accordingly, the base 130 is completely sealed so that flow cannot be moved into the housing 110 except for the intake port 143 and the outlet port 144.

In relation to the base 130, according to a preferred embodiment of the present disclosure, the base 130, as in FIG. 2, may be comprised of a reinforcing plate 131 for structurally reinforcing the bottom of the air drier cartridge 100, and a seaming cap 132 supporting the reinforcing plate 131 under the reinforcing plate 131 and fastened to an end of the housing 110 by flange-type seaming, etc. Meanwhile, other than the fastening structure of flange-type seaming, the base 130 may be completely fixed to the housing 110 by welding, etc.

The air drier cartridge 100 is supposed to be directly mounted on a valve assembly of an air processing system, so the air drier cartridge 100 should have a fastening structure for mounting on an air processing system. Accordingly, the base 130 may include a fastening structure to be directly mounted on the valve assembly of an air processing system, and preferably, may be configured to be thread-fastened to a neck at the inlet of a valve assembly by forming threads round the intake port 146 at the center of the reinforcing plate 131.

Further, at least one intake port 143 may be formed around the intake port 146 at the center of the reinforcing plate 131, and a flange of the seaming cap may be inserted and fixed in the intake port 143. In this case, a gasket 133 for hermetically keeping compressed air may be installed outside the seaming cap, that is, at the valve assembly, and preferably, the gasket 133 may be an annular gasket 133 having a cross-section that is open in a 'ㄷ' shape toward the central axis. Since the gasket 133 having a 'ㄷ'-shaped cross-section is applied, sealing ability according to internal pressure is improved, so the hermetic ability of the air drier cartridge 100 can be further improved. The upper portion of the annular gasket 133 is inserted and fixed in a recess of the seaming cap 132, and a protrusion that protrudes toward the central axis of the cartridge from the outside of the recess of the seaming cap may be formed. Accordingly, it is possible to have a 'ㄷ'-shaped cross-sectional structure, as in FIG. 2, and when a cartridge is coupled to a valve housing (not shown) positioned under the air drier cartridge, the sealing ability according to internal pressure can be improved by the cross-sectional structure of the annular gasket 133.

Further, a sealing member 135 may be inserted between separated components, that is, between the reinforcing plate 131 and the cartridge cover 122 and between the cartridge cover 122 and the cartridge body 121 to sufficiently keep the compressed air channel hermetic in the housing 110. The sealing member may be an O-ring, and a groove in which an O-ring can be fixed may be formed on the outer side of the cartridge cover 122 and the outer side of the reinforcing plate 131 so that the O-rings can be fixed while achieving a sufficient sealing effect.

Meanwhile, according to a preferred embodiment of the present disclosure, the present disclosure is characterized by being configured to filter out oil through two filtering stages before compressed air flowing inside from a compressor passes through the drying agent.

In detail, the cartridge body 121 of the cartridge container 120 is comprised of a cylindrical body part formed a gap 145 between the housing and the cylindrical body part, and a frustoconical body part formed over the cylindrical body part. As shown in FIG. 2, the cylindrical body has a cylindrical structure extending in the direction of the central axis and forms the gap 145 for allowing for flow of compressed air between the outer wall of the cylindrical body and the inner wall of the housing 110.

In a preferred embodiment of the present disclosure, a collision member 125 is installed in the gap 145. The collision member 125 protrudes from the cartridge container 120 or the housing 110 and is configured such that oil and foreign substances are primarily filtered out while the air moving through the gap 145 bumps against collision member 125. The detailed configuration of the collision member will be described below.

Further, the upper portion of the cylindrical body part is connected to the frustoconical body part and the frustoconical body part has a shape of which the radius decreases upward. Further, several ribs 123 radially extending from the center of the cartridge container 120 are formed at the frustoconical body part, and several air inlets 124 are formed between adjacent ribs 123. The air inlets 124 of the frustoconical body part are openings through which air flows to the drying agent in the cartridge container 120.

Meanwhile, the ribs 123 radially extending not only function as reinforcing ribs that structurally reinforce the cartridge container 120, but support the oil adsorption filter 141 to be fixed to the front ends of the air inlets 124. The oil adsorption filter 141 is provided to secondarily filter the compressed air filtered by the collision member and is made of a porous material or a non-woven fabric. In general, the oil adsorption filter 141 is formed by wrapping a porous material or a non-woven fabric around the ribs 123. Accordingly, the oil adsorption filter 141 is space apart from the air inlets 124 of the frustoconical body part and fixed in this state by the ribs 123. Preferably, the frustoconical body part has a two steps of shoulder and the shoulder may radially extend to a position corresponding to the head plate 127. Accordingly, the annular oil adsorption filter 141 is completely in close contact with the cartridge container 120 and completely prevents airflow going around the oil adsorption filter 141, thereby being able to maximize the filtering performance of the oil adsorption filter 141.

Further, in FIG. 2, several air inlets 124 formed at the rear end of the oil adsorption filter 141 are shown, and the air inlets 124 are sufficiently formed on the conical surface of the frustoconical body part. The air inlets 124 are directly related to the contact area with the drying agent and air, so it is preferable that the air inlets 124 are formed at the upper end of the conical surface to be able to sufficiently achieve contact with the drying agent. Further, a blocking region in which the air inlets 124 are not formed is formed at the lower are of the conical surface, thereby being able to prevent oil not filtered out by the oil adsorption filter 141 from flowing into the cartridge container 120. Accordingly, it is preferable to set the area of the air inlets that enable compressed air to flow into the cartridge container without a loss of flow rate and to form the blocking region at the lower portion within a range of securing the area of the air inlets, in consideration of the flow rate of the compressed air flowing inside from the compressor.

Figure 4:
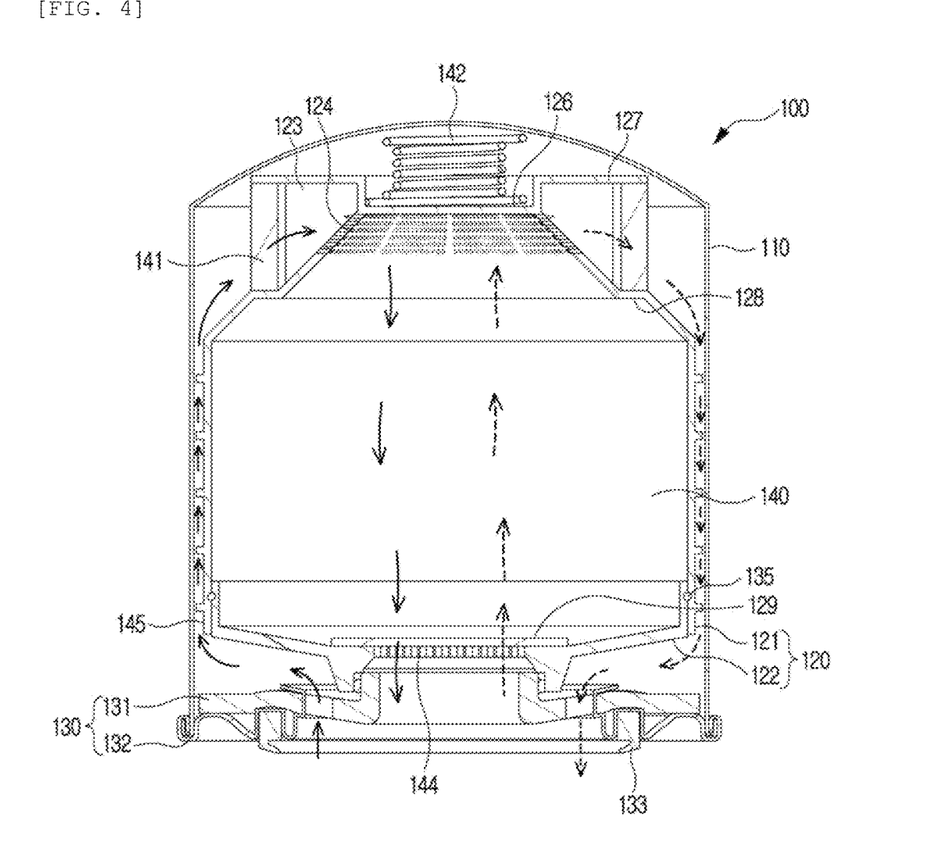
FIG. 4 shows airflow when compressed air is supplied and regenerated in the example of FIG. 2.

FIG. 4 shows airflow when compressed air is supplied and regenerated. In particular, in FIG. 4, the solid line arrows indicate the case in which compressed air is supplied, and the dotted line arrows indicate airflow in regeneration.

The case when compressed air is supplied is described. The air flowing inside through a compressor flows inside through the intake port 143 and moves upward from the lower portion of the housing 110 through the gap 145 between the housing 110 and the cartridge container 120. In this case, when the air passing through the gap 145 hits against the collision member 125 in the gap 145, oil, etc. separate and remain on the collision member 125. For reference, the separated oil remains on the collision member 125 or drops to an oil sump on the bottom of the housing 110 along the outer wall of the housing 110 due to gravity. Thereafter, regeneration is performed, the oil collected in the oil sump is discharged to the atmosphere together with the regenerated air.

The compressed air that has passed through the gap 145 is secondarily filtered through the oil adsorption filter 141, thirdly filtered through the drying agent in the cartridge container 120 such that water is removed, and then finally discharged to the valve assembly through an intake port 146.

Such 3-stage filtering process can provide an improved cleaning effect to the compressed air that has passed through the air drier cartridge 100.

FIGS. 5A to 5D show a detailed examples of the collision member 125 installed on the outer wall of the drier cartridge according to the present disclosure.

Each of the collision members 125 is disposed in the gap 145 between the housing 110 and the cartridge container 120, and may be integrally formed with the cartridge container 120 through injection molding. However, as described above, the collision member 125 may be also formed on the inner wall of the housing 110. For example, the collision member 125 may be formed by forming wrinkles on the outer wall of the metallic housing 110. However, the housing 110 should be formed to be able to resist high pressure, so it is more preferable in terms of stress concentration that the collision member 125 is integrally formed with the cartridge container 120. It is exemplified that the collision member 125 is formed on the cartridge container 120 in the following description, and the collision member 125 formed on the housing 110 may also have a corresponding structure.

Further, FIGS. 5A to 5D show blade type protrusion.

In detail, the blade type protrusion may be at least one blade type protrusion that is continuously extended to be able to guide air from the downstream side of the gap 145 to the upper portion of the gap 145.

Figure 5A:
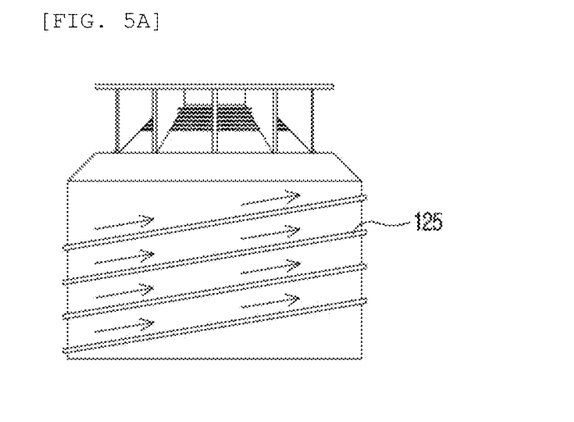
FIGS. 5A to 5D show a detailed structure of a collision member installed on the outer wall of the drier cartridge according to the present disclosure.
Figure 5B:
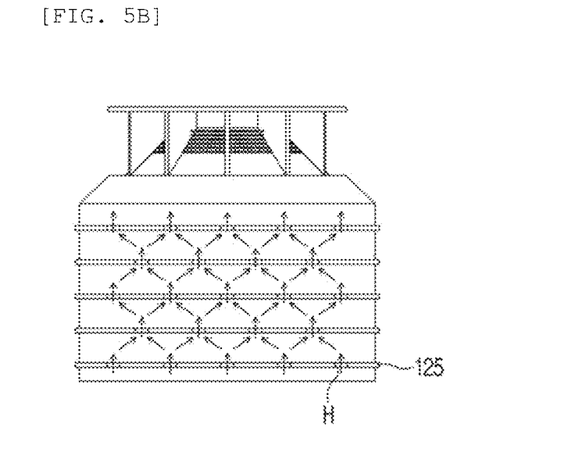
Figure 5C:
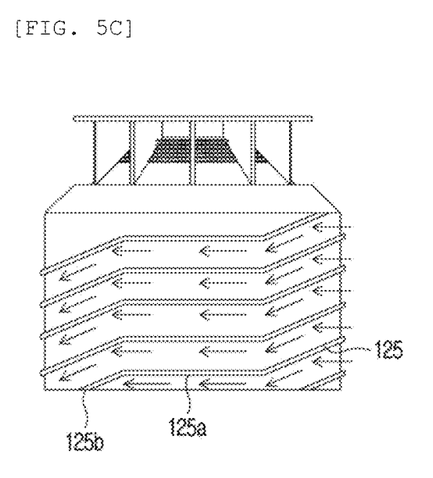

In this case, the collision member 125, as shown in FIG. 5A, may be a spiral blade type protrusion, or as shown in FIG. 5C, may be a blade type protrusion having a horizontal section 125a and an inclined section 125b. The forming of at least one blade type protrusion means that only one protrusion is continuously formed around the cartridge container 120 or several continuous protrusions may be extended around the cartridge container 120 with a predetermined gap therebetween.

In the example of including several protrusions, the number of channels through which compressed air can flow is increased in comparison to when the collision member 125 is comprised of only one protrusion. The number and angle of the blade type protrusions may be appropriately adjusted in accordance with the required airflow, oil filtering performance, etc.

As shown in FIG. 5A, the spiral blade type protrusion has a structure that extends at a predetermined angle from the horizontal plane. The spiral blade type protrusion is configured such that airflow is relatively smooth and oil can be separated by centrifugal force. However, since air and the protrusion do not sufficiently hit against each other, the oil filtering effect may be relatively limited.

Further, FIG. 5B shows an example including several horizontal blade protrusions. As shown in FIG. 5B, the collision member 125 has several horizontal blade protrusions spaced apart from each other and extending in parallel with the horizontal plane perpendicular to the central axis of the cartridge container 120. Several flow holes are formed at the horizontal blade protrusions so that air can move between the upstream side and the downstream side of the gap 145. In this example, the horizontal blade protrusion cannot function as an air flow passage between the upstream side and the downstream side, and functions only a chamber for compressed air. Accordingly, air flow holes should be formed at the horizontal blade protrusion so that compressed air can move upward in this embodiment. The air flow holes may be formed with regular intervals on the horizontal blade protrusions and the holes on the adjacent horizontal blade protrusions are alternately disposed in the vertical direction that is parallel with the central axis, whereby it is possible to improve the oil filtering performance according to collision of air.

Meanwhile, FIG. 5C shows an example, in which the spiral blade of FIG. 5A and the horizontal blade of FIG. 5B are combined. Referring to FIG. 5C, the collision member 125 in this embodiment includes a horizontal section 125a that is parallel with the horizontal plane perpendicular to the central axis of the cartridge container 120, and an inclined section 125b inclined at a predetermined angle with respect to the horizontal plane. Preferably, the horizontal section 125a and the inclined section 125b are alternately disposed in the extension direction, so when air rotates at a high speed, an oil filtering effect by centrifugal force can be implemented while the air flows up. Meanwhile, since air can sufficiently bump against the protrusion while the flow of the air changes, an oil filtering effect by collision can also be achieved. In this case there may be a problem that the separated oil partially adheres to the horizontal section 125a while flowing down along the inclined surface.

Accordingly, in a preferred embodiment of the present disclosure, the horizontal section 125a may be inclined so that the separated oil can be collected downward by gravity without adhering to the blade. In this example, the horizontal section 125a is also extended with a predetermined angle not parallel with the horizontal plane, so the collision member 125 is configured to include two or more protrusion groups having different angles.

Figure 5D:
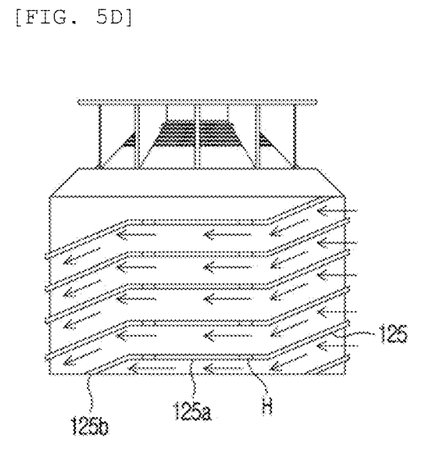

Further, in order to prevent oil from adhering at the horizontal section 125a, as in FIG. 5D, at least one flow hole may be formed in the direction of the central axis at the horizontal section 125a. The flow hole is substantially perpendicular to the flow of air, so it does not influence the airflow and mainly discharges downward the adhering oil.

Figure 6A:
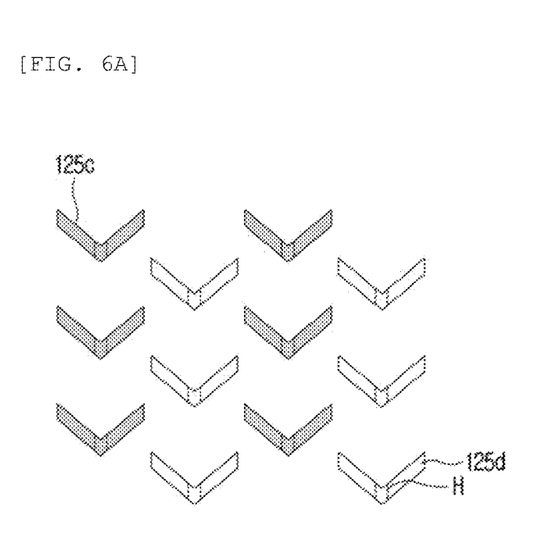
FIGS. 6A to 6F show another example of the detailed structure of the collision member installed on the outer wall of the drier cartridge according to the present disclosure.
Figure 6B:
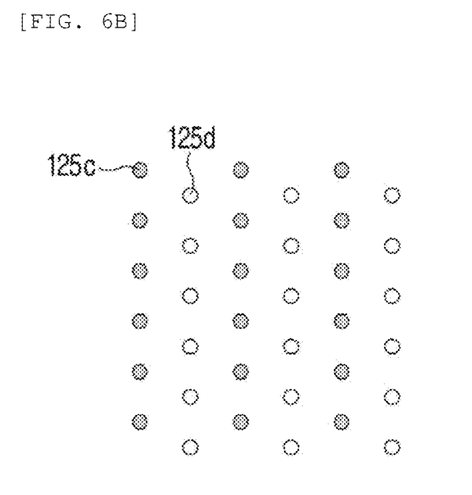
Figure 6C:
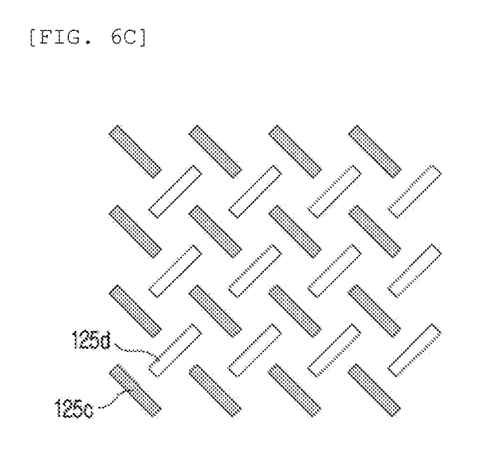

FIGS. 6A to 6C show examples in which the collision member 125 is comprised of several protrusions disposed to have a predetermined pattern.

In the examples of FIG. 6A to 6C, the collision member 125 protrudes around the outer surface of the cartridge container 120 and is comprised of several protrusions spaced apart from each other to be able to interfere with airflow between the upstream side and the downstream side of the gap 145.

In particular, the protrusions may include a first group 125c comprised of several protrusions spaced apart from each other with regular intervals in parallel with the horizontal plane perpendicular to the central axis of the cartridge container 120, and a second group 125d comprised of several protrusions alternately disposed with the protrusions 125c of the first group and spaced apart from each other with regular intervals in parallel with the horizontal plane. In this case, the protrusions of the first group and the protrusions 125d of the second group, as in FIGS. 6A to 6C, may be alternately disposed in the direction of the central axis.

Figure 6D:
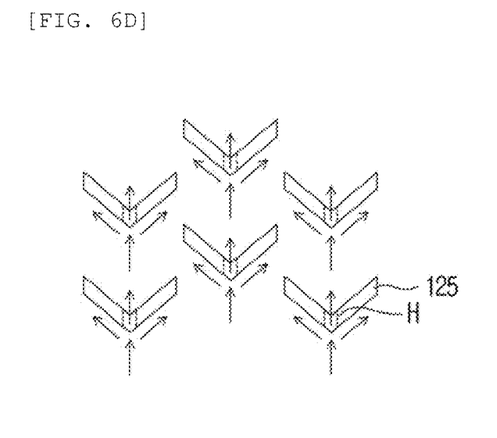

In detail, FIG. 6A shows that the protrusions are V-shaped protrusion and FIG. 6D shows airflow passing through the protrusions. According to the V-shaped protrusions, compressed air hits against the V-shaped protrusions while moving up, as in FIG. 6a, whereby oil is separated. Meanwhile, though not shown, the V-shaped protrusions may be inversed V-shaped, that is, A-shaped protrusions. However, the A-shaped protrusions may excessively restrict flow of compressed air and may generate unnecessarily vortexes when the compressed air is supplied, so it is more preferable to apply V-shaped protrusions. According to the V-shaped protrusions, when air flows in the opposite direction, that is, in regeneration, the flow of compressed air is restricted too. However, unlike when the compressed air is supplied, the compressed air is already regenerated through the drying agent and then passes through the collision member 125, so the influence on regeneration relatively small. Further, flow of the compressed air is restricted by the V-shaped protrusions and the flow speed of the air is decreased, whereby it is possible to reduce noise due to the air that is discharged to the atmosphere in regeneration.

Meanwhile, oil may be accumulated at the grooves of the V-shaped protrusions. In order to solve the problem that oil is excessively accumulated, flow hole for discharging oil may be formed at the V-shaped protrusions. However, the oil accumulated on the V-shaped protrusions can be periodically discharged by hitting of the compressed air that flows inside in regeneration, so the flow hole may be omitted.

Figure 6E:
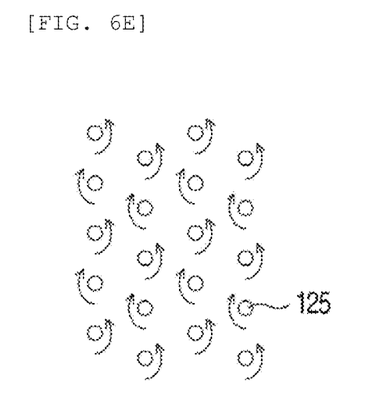

FIG. 6B shows an example in which the protrusions are circular protrusions, as another embodiment of the present disclosure, and FIG. 6E shows the flow of air passing through the protrusions. According to the circular protrusions, air substantially smoothly flows in comparison to the V-shaped protrusions described above, but the oil filtering effect is relatively insufficient.

FIG. 6C shows an example in which plate-shaped protrusions are disposed in opposite directions in groups. As shown in FIG. 6C, in this embodiment, the protrusions 125c of the first group are plate-shaped protrusions formed to have a predetermined angle with respect to the horizontal plane, and the protrusions 125d of the second group are plate-shaped protrusions extending perpendicular to the protrusions of the first group. According to the structure of the collision member 125, air can relatively smooth flow and a good oil filtering effect can be achieved by hitting against the plate-shaped protrusions.

Figure 6F:
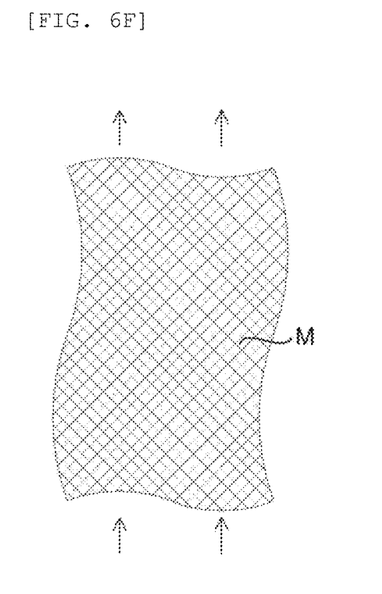

Next, FIG. 6F shows an example in which the collision member is formed in a mesh net M. In the example of FIG. 6F, while air passes through the meshes of the mesh net M, oil is primarily filtered out by the mesh net. Meanwhile, when the mesh net M is densely formed, there may be a side effect that oil excessively adheres to the mesh net M, thereby completely blocking airflow. Considering this problem, a low-density mesh net may be used with any one of the collision members 125 of FIGS. 5A to 5D or any one of the collision members 125 of FIGS. 6A to 6C described above.

Figure 7A:
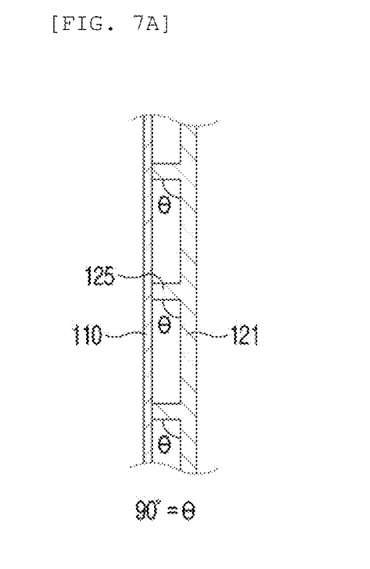
FIGS. 7A and 7B show an example in which the side angle of the collision member is changed.
Figure 7B:
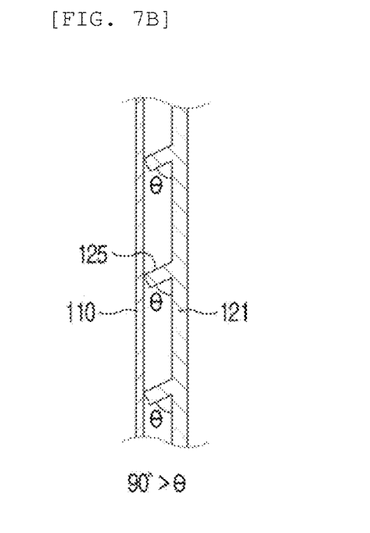

Next, FIGS. 7A and 7B show an example in which the side angle of the collision member 125 is changed. Here, the side angle means the angle θ made between the bottom of the protrusion and the outer surface of the cartridge container 120.

First, FIG. 7A shows the case in which the angle θ made between the bottom of the protrusion and the outer surface of the cartridge container 120 is 90 degrees and FIG. 7B shows the angle θ is less than 90 degrees.

When the angle θ is set as 90 degrees, as in FIG. 7A, there is an advantage that it is easy to integrally form the protrusions with the cartridge 120 through injection molding.

Meanwhile, as in FIG. 7B, when the angle θ is less than 90 degrees, the protrusions face down, so there is an effect that oil naturally flows down without being accumulated.

Further, when they are combined with the blade type protrusions, there is an effect that air smoothly flows when compressed air is supplied and regenerated. If when compressed air flows substantially upward from the lower portion, the flow of the compressed air is interfered with the protrusions facing down, so the compressed air may be partially lost in the supply process. However, according to a preferred embodiment of the present disclosure, since the continuous blade type protrusions including a spiral section are substantially in close contact with the wall of the housing 110, they can remove this defect while functioning as channels for guiding compressed air. Accordingly, when the continuous blade type protrusions including a spiral section are formed, it is possible to effectively suppress accumulation of oil by forming the protrusions at an angle less than 90 degrees, as in FIG. 7B. Accordingly, the angle θ of the protrusions may in the range of $0° < θ ≤ 90°$, and more preferably, the angle of the protrusions may be in the range of $45° < θ ≤ 90°$.

INDUSTRIAL APPLICABILITY

The present disclosure was described above on the basis of embodiments and the accompanying drawings. However, the range of the present disclosure is not limited by the embodiments and drawings and may be limited only by claims to be described below.

The invention claimed is:

1. An air drier cartridge for a compressed air processing system for a commercial vehicle, the air drier cartridge comprising: a cartridge container having a drying agent in an internal space thereof; a housing for accommodating the cartridge container; a spring member installed in the housing to press the cartridge container; and a base configured to close an open side of the housing and having an intake port and a discharge port so that air can move into the housing, wherein a gap for movement of compressed air is formed between an outer surface of the cartridge container and an inner wall of the housing, and a collision member is formed in the gap to filter out oil when air moving in the gap bumps against the collision member before reaching an oil adsorption filter.

2. The air drier cartridge of claim 1, wherein the cartridge container includes a cartridge body comprised of a cylindrical body part forming the gap between the housing and the cylindrical body part, and a frustoconical body part formed at the upper portion of the cylindrical body part.

3. The air drier cartridge of claim 2, wherein several ribs radially extending from the center of the cartridge container are formed at the frustoconical body part, and the oil adsorption filter is an annular oil adsorption filter installed at the ribs.

4. The air drier cartridge of claim 3, wherein several openings are formed along a conical surface at the upper end of the frustoconical body part so that air that has passed through the oil adsorption filter can flow into the cartridge container, and a blocking region for blocking airflow is formed at the lower end.

5. The air drier cartridge of claim 1, wherein the collision member protrudes from the outer surface of the cartridge container or the inner wall of the housing, and is comprised of at least one blade type protrusion continuously extending to be able to guide air to the upper portion of the gap from the lower portion of the gap.

6. The air drier cartridge of claim 5, wherein the at least one blade type protrusion is a spiral blade type protrusion.

7. The air drier cartridge of claim 5, wherein the at least one blade type protrusion has a horizontal section parallel with a horizontal plane perpendicular to a central axis of the cartridge container and an inclined section inclined at a predetermined angle with respect to the horizontal plane that are alternately disposed.

8. The air drier cartridge of claim 7, wherein several flow holes are formed in the direction of the central axis at the horizontal section of the blade type protrusion.

9. The air drier cartridge of claim 5, wherein the at least one blade type protrusion comprises: several horizontal blade protrusions spaced apart from each other and extending in parallel with the horizontal plane perpendicular to the central axis of the cartridge container; and several flow holes formed at the horizontal blade protrusions so that air can move between the upstream side and the downstream side of the gap.

10. The air drier cartridge of claim 1, wherein the collision member is comprised of several protrusions protruding from the outer surface of the cartridge container or the inner wall of the housing and spaced apart from each other to interfere with flow of air between the upstream side and the downstream side of the gap.

11. The air drier cartridge of claim 10, wherein the protrusions include a first group comprised of several protrusions spaced apart from each other with regular intervals in parallel with the horizontal plane perpendicular to the central axis of the cartridge container, and a second group comprised of several protrusions alternately disposed with the protrusions of the first group and spaced apart from each other with regular intervals in parallel with the horizontal plane; and the protrusions of the first group and the protrusions of the second group are alternately disposed in the direction of the central axis.

12. The air drier cartridge of claim 11, wherein the protrusions are V-shaped protrusions.

13. The air drier cartridge of claim 11, wherein the protrusions are circular protrusions.

14. The air drier cartridge of claim 11, wherein the protrusions of the first group are plate-shaped protrusions formed to have a predetermined angle with respect to the horizontal plane, and the protrusions of the second group are plate-shaped protrusions extending perpendicular to the protrusions of the first group.

15. The air drier cartridge of claim 1, wherein the collision member is a mesh net.

16. The air drier cartridge of claim 5, wherein the at least one protrusion is formed on the outer surface of the cartridge container, and is formed to face down such that an angle θ made between the bottom of the protrusion and the outer surface of the cartridge container is in the range of $0°<\theta\leq90°$.

17. The air drier cartridge of claim 10, wherein the protrusions are formed on the outer surface of the cartridge container, and are formed to face down such that an angle θ made between the bottom of the protrusion and the outer surface of the cartridge container is in the range of $0°<\theta\leq90°$.

\* \* \* \* \*